(12) United States Patent
Kusumoto et al.

(10) Patent No.: US 8,766,113 B2
(45) Date of Patent: Jul. 1, 2014

(54) SENSOR MECHANISM BODY COMPRISING TWO ROBERVAL MECHANISMS AND ELECTRONIC BALANCE USING THE SAME

(75) Inventors: Tetsuro Kusumoto, Kyoto (JP); Toshihiro Koide, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 400 days.

(21) Appl. No.: 13/148,542

(22) PCT Filed: Feb. 10, 2009

(86) PCT No.: PCT/JP2009/052214
§ 371 (c)(1),
(2), (4) Date: Aug. 9, 2011

(87) PCT Pub. No.: WO2010/092663
PCT Pub. Date: Aug. 19, 2010

(65) Prior Publication Data
US 2011/0315458 A1    Dec. 29, 2011

(51) Int. Cl.
*G01G 23/01* (2006.01)

(52) U.S. Cl.
USPC ............. 177/212; 177/210 EM; 177/229

(58) Field of Classification Search
USPC ............ 177/210 EM, 212, 229; 73/1.13, 1.15
See application file for complete search history.

(56) References Cited

U.S. PATENT DOCUMENTS

| | | | |
|---|---|---|---|
| 4,799,561 A * | 1/1989 | Komoto | 177/229 |
| 5,340,951 A * | 8/1994 | Hungerbuhler et al. | 177/229 |
| 6,563,060 B2 * | 5/2003 | Komoto | 177/21 OEM |
| 7,076,990 B2 * | 7/2006 | Yoshikuwa | 73/1.13 |
| 7,091,428 B2 * | 8/2006 | Ikeshima | 177/229 |
| 8,044,308 B2 * | 10/2011 | Kusumoto | 177/21 OEM |

FOREIGN PATENT DOCUMENTS

| | | |
|---|---|---|
| JP | 7-35601 A | 2/1995 |
| JP | 10-90046 A | 4/1998 |
| JP | 2001-343279 A | 12/2001 |
| JP | 2004-61257 A | 2/2004 |
| WO | 2008/026378 A1 | 3/2008 |

OTHER PUBLICATIONS

Written Opinion of the International Searching Authority issued in International Application No. PCT/JP2009/052214, with Date of mailing May 26, 2009 and English Translation.

* cited by examiner

*Primary Examiner* — Randy W Gibson
(74) *Attorney, Agent, or Firm* — McDermott Will & Emery LLP

(57) ABSTRACT

A sensor mechanism body having a main Roberval mechanism; a sub-Roberval mechanism provided with a second fixed column connected with an electronic balance base, a second movable column supporting the load of an internal weight placed on an engaging section, and two second beams, parallel to each other, and connecting the second movable column to the second fixed column. A first lever rockably supported by a first fulcrum, connected to one end of a first movable column of the main Roberval mechanism, and the other end connected to a second lever. The second lever rockably supported by a second fulcrum, connected to one end of a second movable column of the sub-Roberval mechanism, and the other end connected to an electromagnetic force generating device and the other end of the first lever. The second fixed column is connected to the second lever through a thin-walled connecting.

6 Claims, 13 Drawing Sheets

FIG.7 Prior Art
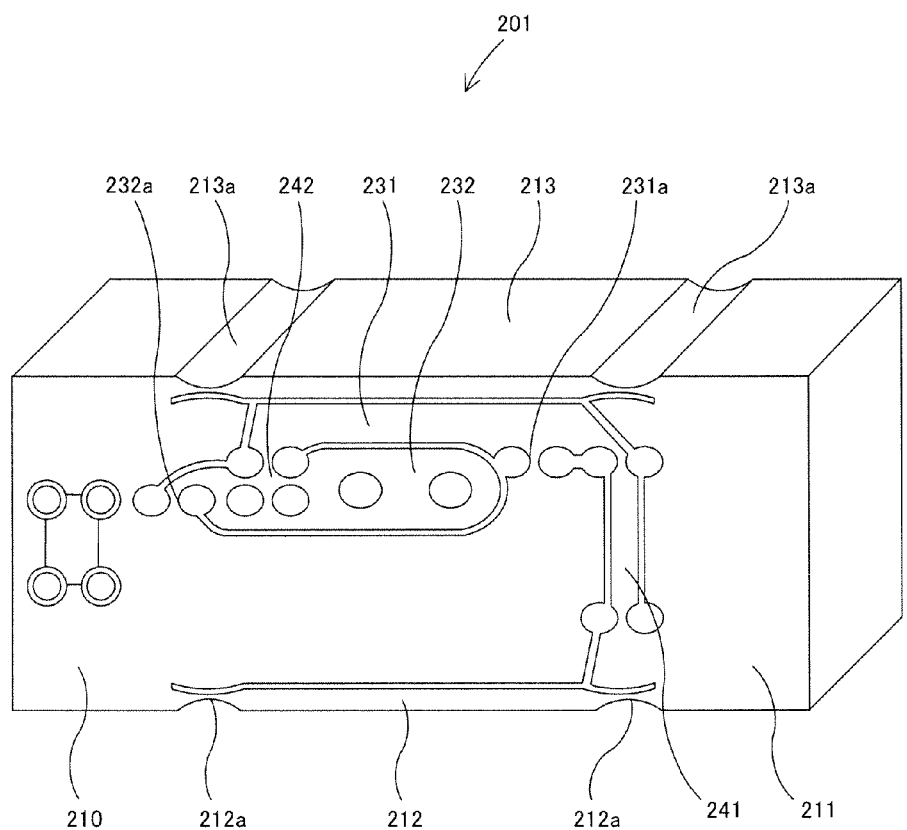
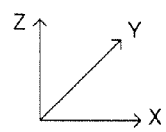

SENSOR MECHANISM BODY COMPRISING TWO ROBERVAL MECHANISMS AND ELECTRONIC BALANCE USING THE SAME

CROSS REFERENCE TO PRIOR APPLICATIONS

This application is a U.S. National Phase application under 35 U.S.C, §371 of International Application No. PCT/JP2009/052214, filed on Feb. 10, 2009. The International Application was published in Japanese on Aug. 19, 2010 as WO 2010/092663 A1, under PCT Article 21(2). All of the applications are herein incorporated by reference.

TECHNICAL FIELD

The present invention relates to a sensor mechanism body that works as a load sensor and an electronic balance using the same, and in particular to a sensor mechanism body that carries out correction by means of an internal weight and an electronic balance using the same.

BACKGROUND ART

In general electronic balances, an electromagnetic force generating device generates electromagnetic force which resists the displacement of the movable member in the sensor mechanism body due to the load of an object to be measured, and thus the load of the object to be measured is measured from the volume of the electromagnetic force that has been generated to make the displacement of the movable member in the sensor mechanism body zero.

An example of the sensor mechanism body where a movable member displaces due to the load of the object to be measured is formed of a Roberval mechanism (also referred to as parallel guide) provided with a fixed column fixed to an electronic balance base, a movable column (movable member) for transmitting the load of the object to be measured mounted on the weighing plate, and two beams parallel to each other for connecting the movable column to the fixed column. In the sensor mechanism bodies having such a Roberval mechanism formed in them, the displacement of the movable column due to the load of the object to be measured can be regulated in the vertical direction, and furthermore a shift error due to the location in which the object to be measured is placed on the weighing plate can be cancelled out.

Furthermore, the sensor mechanism bodies transmit the displacement of the movable column in the Roberval mechanism to the electromagnetic force generating device with a large lever ratio, and therefore are provided with a lever rockably supported by a fulcrum so that the displacement of the movable column in the Roberval mechanism connected to one end of the lever is transmitted to the electromagnetic force generating device connected to the other end of the lever.

Electronic balances provided with a sensor mechanism body where such a Roberval mechanism and a lever are integrally formed in one rectangular parallelepiped block made of metal (so-called single block type sensor mechanism body) have been known (see Patent Document 1).

FIG. 7 is a side view showing an example of a single block type sensor mechanism body, FIG. 8 is a side view showing an example of an electronic balance provided with the sensor mechanism body shown in FIG. 7, and FIG. 9 is a diagram schematically showing the structure of the electronic balance shown in FIG. 7.

The sensor mechanism body 201 is one rectangular parallelepiped block body made of an aluminum alloy and is formed of a Roberval mechanism R, a first lever 231, a second lever 232, and connection members 241, 242 for connecting the Roberval mechanism R to the first lever 231 and the second lever 232 through holes and slits which penetrate in the direction Y (direction of thickness).

The Roberval mechanism R is formed of a fixed column 210 which is fixed to an electronic balance base (not shown) through an attachment member 7 made of a separate member, a movable column 211 where a plate support 2a is fixed to the top, and two beams 212, 213 having flexible sections (hinge sections) 212a, 213a at the two ends. Thus, the movable column 211 and the fixed column 210 are connected through the two beams 212, 213 that are parallel to each other in the structure. Here, the weighing plate 2 on which an object to be measured is placed is placed on top of the plate support 2a. As a result, the displacement of the movable column 211 due to the load of the object to be measured is regulated in the direction Z (vertical direction).

The first lever 231 freely inclines around the center of the elastic first fulcrum 231a, and the second lever 232 freely inclines around the center of the elastic second fulcrum 232a.

In addition, the movable column 211 in the Roberval mechanism R is connected to one end of the first lever 231 through the connection member 241, and the other end of the first lever 231 is connected to one end of the second lever 232 in the vicinity of the second fulcrum 232a through the connection member 242. The base section of a support member 6 made of a separate member is fixed by means of screws to the other end of the second lever 232 that is away from the second fulcrum 232a. As a result, the load of the object to be measured mounted on the weighing plate 2 makes the end of the support member 6 incline through the movable column 211, the connection member 241, the first lever 231, the connection member 242 and the second lever 232.

Such a displacement of the end of the support member 6 is detected by the displacement sensor 9 fixed to the electronic balance base. In addition, the force coil 3a in the electromagnetic force generating device 3 is fixed to the end of the support member 6. As a result, the amount of current flowing through the force coil 3a in the electromagnetic force generating device 3 is controlled by a servo mechanism (not shown) on the basis of the signal detected by the displacement sensor 9 so that the displacement of the end of the support member 6 is zero. In addition, the load of the object to be measured is measured from the amount of current flowing that is controlled by the servo mechanism.

Meanwhile, in electronic balances, the amount of current which makes equilibrium predetermined load may fluctuate day by day due to a change in the temperature or the like. As a result, there may be an error in the measured load of the object to be measured (results of measurement). Therefore, it is necessary to carry out correction using a weight for correction before the load of the object to be measured is measured in order to prevent the results of measurement from causing an error due to a change in the temperature or the like.

The weight for correction must be handled or maintained with special care, and therefore some electronic balances have an internal weight installed in advance (see Patent Document 2). In these electronic balances where an internal weight is installed, correction is carried out appropriately through the operation of a button by an operator or automatically carried, by a signal from a timer or a temperature sensor.

FIG. 10 is a diagram schematically showing the structure of an electronic balance where an internal weight is installed. The electronic balance 110 is provided with a main Roberval mechanism R1 for transmitting the load of the object to be measured mounted on the weighing plate 2 in the direction Z (vertical direction); a sub-Roberval mechanism R2 for transmitting the load of the internal weight 4 mounted on the engaging section 5; a switching mechanism (not shown) that can switch the position of the internal weight 4 between the one mounted on the engaging section 5 and the one not mounted on the engaging section 5; a first lever 31 rockably supported by the first fulcrum 31a; a second lever 32 rockably supported by the second fulcrum 32a; connection members 41, 142, 143 for connecting the main Roberval mechanism R1, the sub-Roberval mechanism R2, the first lever 31 and the second lever 32 to each other; and an electromagnetic force generating device 3 for generating an electromagnetic force.

In this electronic balance 110, the second movable column 21 in the sub-Roberval mechanism R2 is connected through a connection member 143 to one end of the second lever 32 which is on the opposite side of the other end of the second lever 2 connected to the electromagnetic force generating device 3 in order to carry out correction using the internal weight 4. The sub-Roberval mechanism R2 is formed of a common fixed column 10 fixed to the electronic balance base, the second movable column 21 to which the engaging section 5 is fixed, and two second beams 22, 23 having flexible sections (hinge sections) 22a, 23a at both ends. In addition, the second movable column 21 and the common fixed column 10 are connected through the two second beams 22, 23 which are parallel to each other in the structure. As a result, the displacement of the second movable column 21 due to the load of the internal weight 4 is regulated in the direction Z (vertical direction).

Thus, the switching mechanism does not place the internal weight 4 on the engaging section 5 when the load of an object to be measured is measured while the switching mechanism mounts the internal weight 4 on the engaging section 5 when correction is carried out so that the load of the internal weight 4 is transmitted to the second movable column 21. When the load of the internal weight 4 is transmitted to the second movable column 21, the second lever 232 inclines through the connection member 143.

Patent Document 1: Japanese Unexamined Patent Publication 2004-61257
Patent Document 2: Japanese Patent No. 3645372

DISCLOSURE OF THE INVENTION

Problem to be Solved by the Invention

The present inventors fabricated a single block type sensor mechanism body 101, as shown in FIG. 11, in order to form an electronic balance 110 where an internal weight 4 is installed, as shown in FIG. 10. FIG. 12 is a side view showing an example of an electronic balance provided with the sensor mechanism body shown in FIG. 11. FIG. 13(a) is a cross sectional diagram along line H-H of FIG. 11, FIG. 13(b) is a cross sectional diagram along line I-I of FIG. 11, and FIG. 13(c) is a cross sectional diagram along line J-J of FIG. 11.

The sensor mechanism body 101 is one rectangular parallelepiped block body made of an aluminum alloy and is formed of a main Roberval mechanism R1, a sub-Roberval mechanism R2, a first lever 31, a second lever 32 and connection members 41, 142, 143 for connecting the main Roberval mechanism R1, the sub-Roberval mechanism R2, the first lever 31 and the second lever 32 to each other through holes and slits which penetrate in the direction Y (direction of thickness).

The main Roberval mechanism 111 is formed of a common fixed column 10 fixed to the electronic balance base through an attachment member 7, a first movable column 11 where a plate support 2a is fixed to the top surface, and two first beams 12, 13 having flexible sections 12a, 13a at the two ends. In addition, the first movable column 11 and the common fixed column 10 are connected through the two first beams 12, 13 that are parallel to each other in the structure. As a result, the displacement of the first movable column 11 due to the load of the object to be measured is regulated in the direction Z (vertical direction).

The sub-Roberval mechanism R2 is formed of a common fixed column 10, a second movable column 21 to which an engaging section 5 is fixed by means of screws, and two second beams 22, 23 having flexible sections 22a, 23a at the two ends. In addition, the second movable column and the common fixed column 10 are connected through the two second beams 22, 23 that are parallel to each other in the structure. Here, the internal weight 4 is mounted on the engaging section 5 fixed to the second movable column 21. As a result, the displacement of the second movable column 21 due to the load of the internal weight 4 is regulated in the direction Z (vertical direction).

The first lever 31 freely inclines around the center of the first fulcrum 31a, and the second lever 32 freely inclines around the center of the second fulcrum 32a.

In addition, the first movable column 11 in the main Roberval mechanism R1 is connected to one end of the first lever 31 through the connection member 41, and the other end of the first lever 31 is connected to one end of the second lever 32 in the vicinity of the second fulcrum 32a through the connection member 142. The base section of the support member 6 is fixed by means of screws to the other end of the second lever 32, which is away from the second fulcrum 32a. As a result, the load of the object to be measured mounted on the weighing plate 5 inclines the end of the support member 6 through the first movable column 11, the connection member 41, the first lever 31, the connection member 142 and the second lever 32.

In addition, the second movable column 21 in the sub-Roberval mechanism R2 is connected to one end of the second lever 32 through the connection member 143. As a result, the load of the internal weight 4 mounted on the engaging section 5 inclines the end of the support member 6 through the second movable column 21, the connection member 143 and the second lever 32.

Incidentally, a shift error can be cancelled out in the main Roberval mechanism R1 in such a state that the two first beams 12, 13 are adjusted with precision so as to be parallel, and the adjustment of the first beams 12, 13 required to cancel out the shift error is not achieved only with precision in processing, but also with the adjustment of location in which the object to be measured is placed on the weighing plate 2 after processing and assembly, and thus a so-called adjusting operation for a shift error is required. Concretely the adjusting operation for a shift error is carried out by shaving parts of the flexible sections 12a, 13a formed at the two ends of the first beams 12, 13 with a file while changing the location in which the object to be measured is placed on the weighing plate 2 so that the effective center of the flexible sections 12a, 13a and the rigidity of the flexible sections 12a, 13a are changed.

In the case where the sub-Roberval mechanism R2 for transmitting the load of the internal weight 4 is formed, however, the shift error cannot be cancelled out when the load of the object to be measured is applied to an end of the weighing plate 2 in the direction of the width (direction Y) of the sensor on the weighing plate 2 so that a large twisting torque is applied by carrying out an adjusting operation for a shift error so that parts of the flexible sections 12a, 13a are shaved by a file while changing the location in which the object to be measured is placed on the weighing plate 2.

Means for Solving Problem

The present inventors examined cause as to why the shift error cannot be cancelled out even when an adjusting operation for a shift error is carried out in the case where a sub-Roberval mechanism R2 for transmitting the load of the internal weight 4 is formed in order to solve the above described problem. As a result, it was found that the twisting of the path from the sub-Roberval mechanism R2 works on the second lever 32 because one end of the second lever 32 is connected to the common fixed column (second fixed column) 10 through the connection member 143, the second movable column 21 and the second beams 22, 23. Thus, it was found that the amount of twisting which works on the second lever from the second fixed column can be adjusted by connecting the second fixed column in the sub-Roberval mechanism to the second lever through a thin-walled connection section where cuts are created in opposite ends in the direction Y (direction of thickness).

That is to say, the sensor mechanism body according to the present invention is a sensor mechanism body having: a main Roberval mechanism provided with a first fixed column fixed to or integrated with an electronic balance base, a first movable column for transmitting the load of an object to be measured placed on a weighing plate, and two first beams parallel to each other for connecting the first movable column to the first fixed column so that the first movable column transmits the load of the object to be measured in the vertical direction; a sub-Roberval mechanism provided with a second fixed column fixed to or integrated with the above described electronic balance base, a second movable column for transmitting the load of an internal weight mounted on an engaging section, and two second beams parallel to each other for connecting the second movable column to the second fixed column so that the second movable column transmits the load of the internal weight in the vertical direction; a first lever rockably supported by a first fulcrum where the first movable column in the main Roberval mechanism is connected to a first end and a second lever is connected to a second end; and the second lever rockably supported by a second fulcrum where the second movable column in the sub-Roberval mechanism is connected to one end, and an electromagnetic force generating device and the second end of the first lever are connected to the other end, wherein the second fixed column in the above described sub-Roberval mechanism is connected to the second lever through a thin-walled connection section where cuts are created in opposite ends in the direction of the thickness, which is perpendicular to the above described vertical direction.

In the sensor mechanism body according to the present invention, even when a sub-Roberval mechanism for transmitting the load of the internal weight is formed, the second fixed column in the sub-Roberval mechanism is connected to the second lever through a thin-walled connection section having cuts created in opposite ends in the direction of the thickness thereof, and therefore the thin-walled connection section is flexible and changes its form so that the amount of twist of the path from the first lever and the amount of twist of the path from the sub-Roberval mechanism become the same along the second lever, and thus the position of the second lever in the case where the twisting torque works on the second lever can be maintained at the same state in the case where the twisting torque is not working on the second lever. Thus, the shift error that could be caused by the twisting from the sub-Roberval mechanism can be cancelled out.

In addition, in the above described invention, the sensor mechanism body may further have a connection member for connecting the above described second movable column to the second lever, and the above described thin-walled connection section may be formed in a first attachment section for attaching the above described connection member to the second movable column, a second attachment section for attaching the connection member to the second lever, or a connection member section between the first attachment section and the second attachment section.

In addition, in the above described invention, the above described second beams may have flexible sections at the two ends, and the above described thin-walled connection section may be formed in a flexible section or in a portion of a second beam between the flexible sections.

Furthermore, in the above described invention, the above described first fixed column and the second fixed column may be the same.

Furthermore, in the above described invention, the above described main Roberval mechanism, sub-Roberval mechanism, first lever and second lever may be formed so as to be integrated into a rectangular parallelepiped block through a number of through holes and slits provided so as to penetrate in the direction of the thickness.

Moreover, the electronic balance according to the present invention has: the sensor mechanism body as described above; the above described internal weight; the above described electromagnetic force generating device; and a switching mechanism that can switch the state of the above described internal weight between the one where the load of the above described internal weight is applied to the engaging section in the sub-Roberval mechanism and the one where the load of the above described internal weight is not applied to the engaging section in the sub-Roberval mechanism.

BRIEF DESCRIPTION OF THE DRAWINGS

FIG. 7 is a side diagram showing an example of a single block type sensor mechanism body;

EXPLANATION OF SYMBOLS

| | |
|---|---|
| 1, 51, 61, 101, 201 | sensor mechanism body |
| 3 | electromagnetic force generating device |
| 4 | internal weight |
| 5 | engaging section |
| 10 | common fixed column (first fixed column, second fixed column) |
| 11 | first movable column |
| 12, 13 | first beams |
| 21 | second movable column |
| 22, 93, 69, 63 | second beams |
| 31 | first lever |
| 31a | first fulcrum |
| 32 | second lever |
| 32a | second fulcrum |
| 42a, 42b, 43a, 43b | cut sections |
| R1 | main Roberval mechanism |
| R2 | sub-Roberval mechanism |

BEST MODE FOR CARRYING OUT THE INVENTION

In the following, the preferred embodiments of the present invention are described in reference to the drawings. Here, the present invention is not limited to the below described embodiments and naturally includes various modifications as long as the scope of the present invention is not deviated from.

First Embodiment

Figure 1:
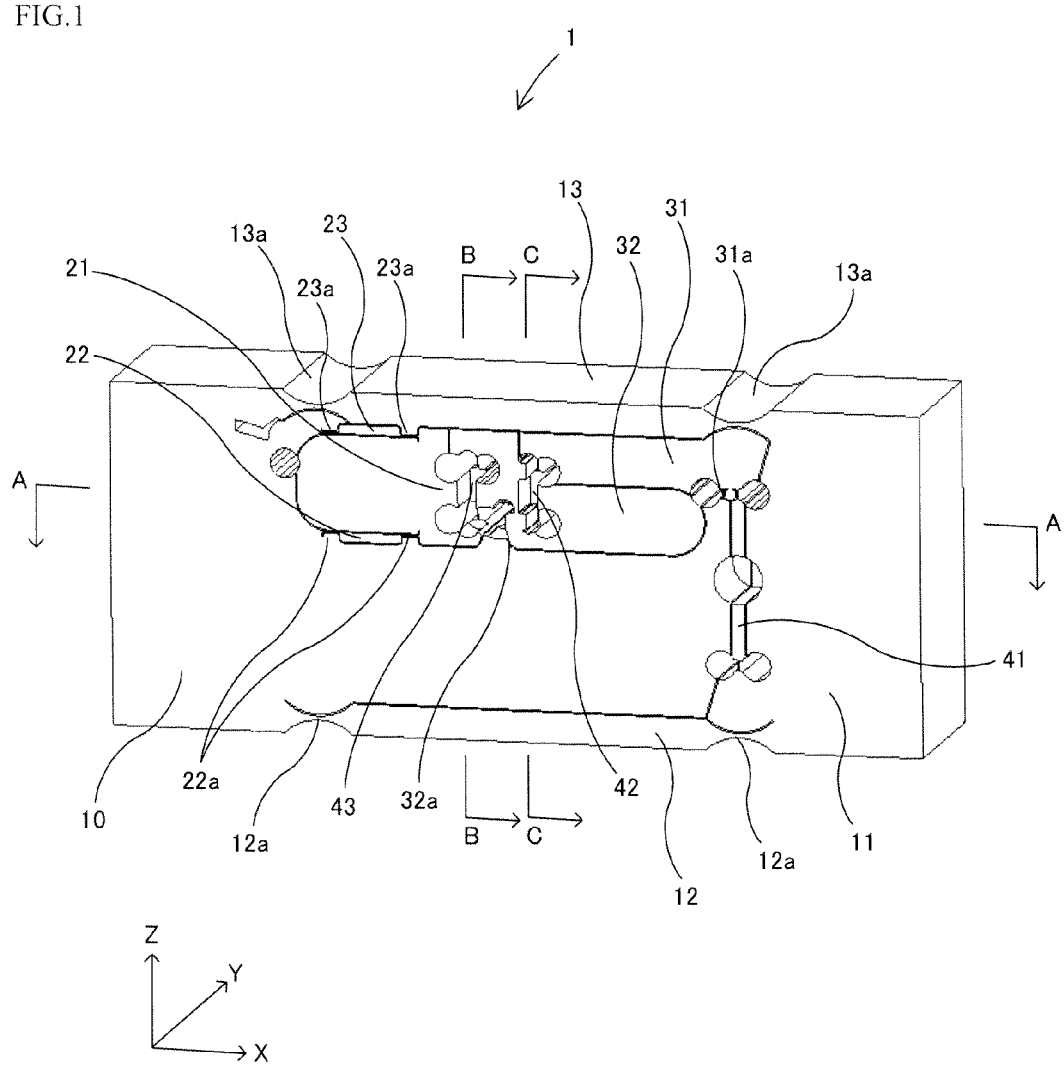
FIG. 1 is a side diagram showing an example of the single block type sensor mechanism body according to the first embodiment.
Figure 2:
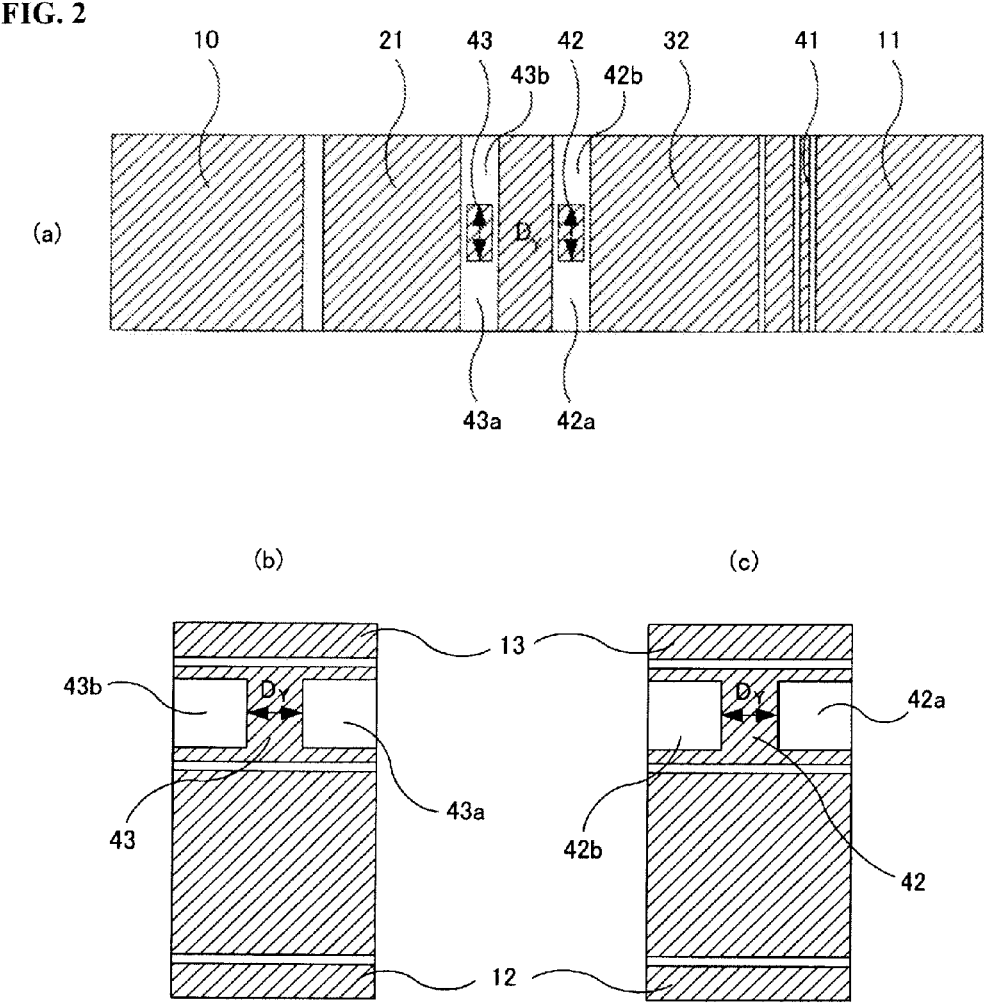
FIGS. 2(a) to 2(c) are cross sectional diagrams showing the sensor mechanism body in FIG. 1.

FIG. 1 is a side diagram showing an example of the single block type sensor mechanism body according to the first embodiment, FIG. 2(a) is a cross sectional diagram along line A-A in FIG. 1, FIG. 2(b) is a cross sectional diagram along line B-B in FIG. 1, and FIG. 2(c) is a cross sectional diagram along line C-C in FIG. 1. Here, the same symbols are attached to the same components as in the above described sensor mechanism body 101 and the descriptions thereof are not repeated.

The sensor mechanism body 1 is one rectangular parallelepiped block body made of an aluminum alloy and formed of a main Roberval mechanism R1, a sub-Roberval mechanism R2, a first lever 31, a second lever 32 and connection members 41, 42 and 43 for connecting the main Roberval mechanism Ra, the sub-Roberval mechanism R2, the first lever 31 and the second lever 32 to each other through holes and slits which penetrate in the direction Y (direction of the thickness).

Cut sections 42a, 42b, 43a and 43b where a flexible section or a connection member have cuts in opposite ends are created in the direction Y (direction of the thickness) in the connection members 42, 43, the second attachment section for attaching the connection members 42, 43 to the second lever 32, and the first attachment section for attaching the connection members 42, 43 to the first lever 31.

Here, the size of the cut sections 42a, 42b, 43a and 43b are determined by calculations, adjusting operations and the like so that the amount of twist of the path from the first lever 31 and the amount of twist of the path from the sub-Roberval mechanism R2 are the same along the second lever 32. At this time, the amount of twist of the path from the sub-Roberval mechanism R2 is considerably greater than the amount of twist of the path from the first lever 31, and therefore only the cut sections 43a and 43b may be created without cut sections 42a and 42b.

As a result, the common fixed column 10 in the sub-Roberval mechanism R2 is connected to the second lever 32 through the second beams 22, 23, the second movable column 21 and the connection member 43 having a thickness $D_y$, and therefore the amount of twist of the path from the first lever 31 and the amount of twist of the path from the sub-Roberval mechanism R2 can be the same along the second lever 32 when the flexible sections and the connection members flexibly change their forms, and thus the position of the second lever 32 in the case where a twisting torque works on the second lever 32 can be maintained the same as in the state in the case where the twisting torque is not working on the second lever 32. Accordingly a shift error that could be caused by the twist from the sub-Roberval mechanism R2 can be cancelled out.

Second Embodiment

Figure 3:
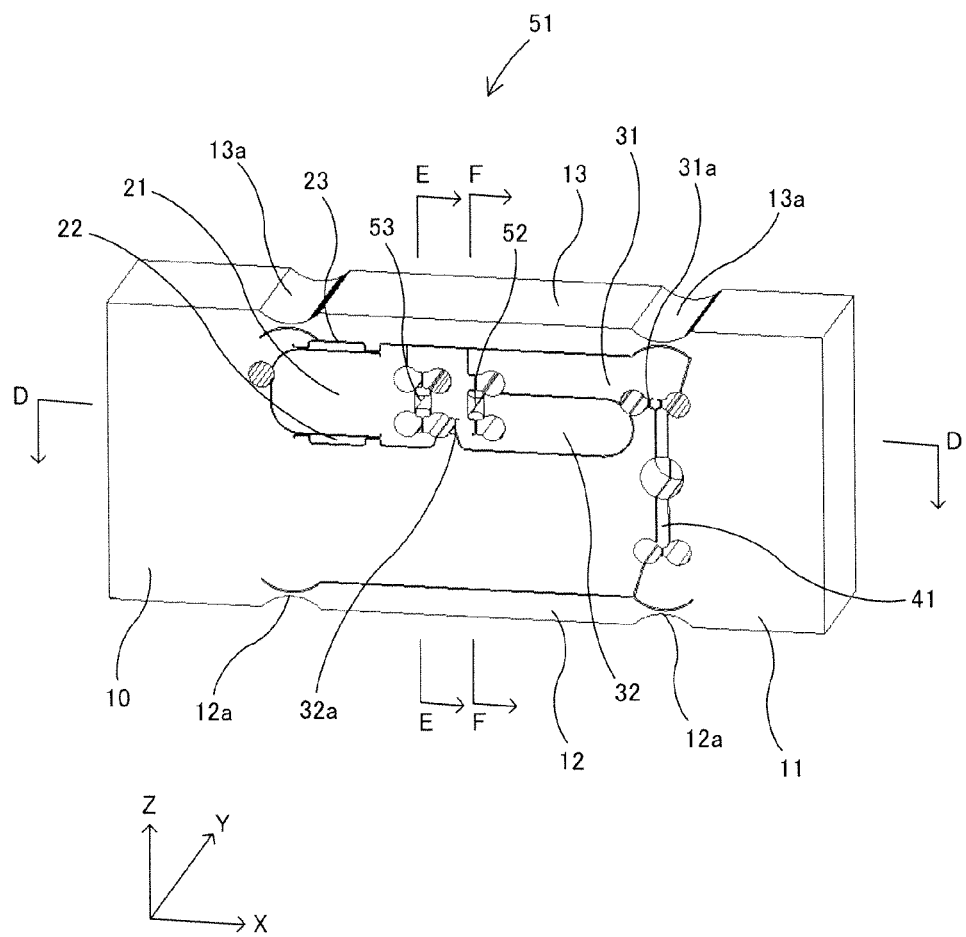
FIG. 3 is a side diagram showing an example of the single block type sensor mechanism body according to the second embodiment.
Figure 4:
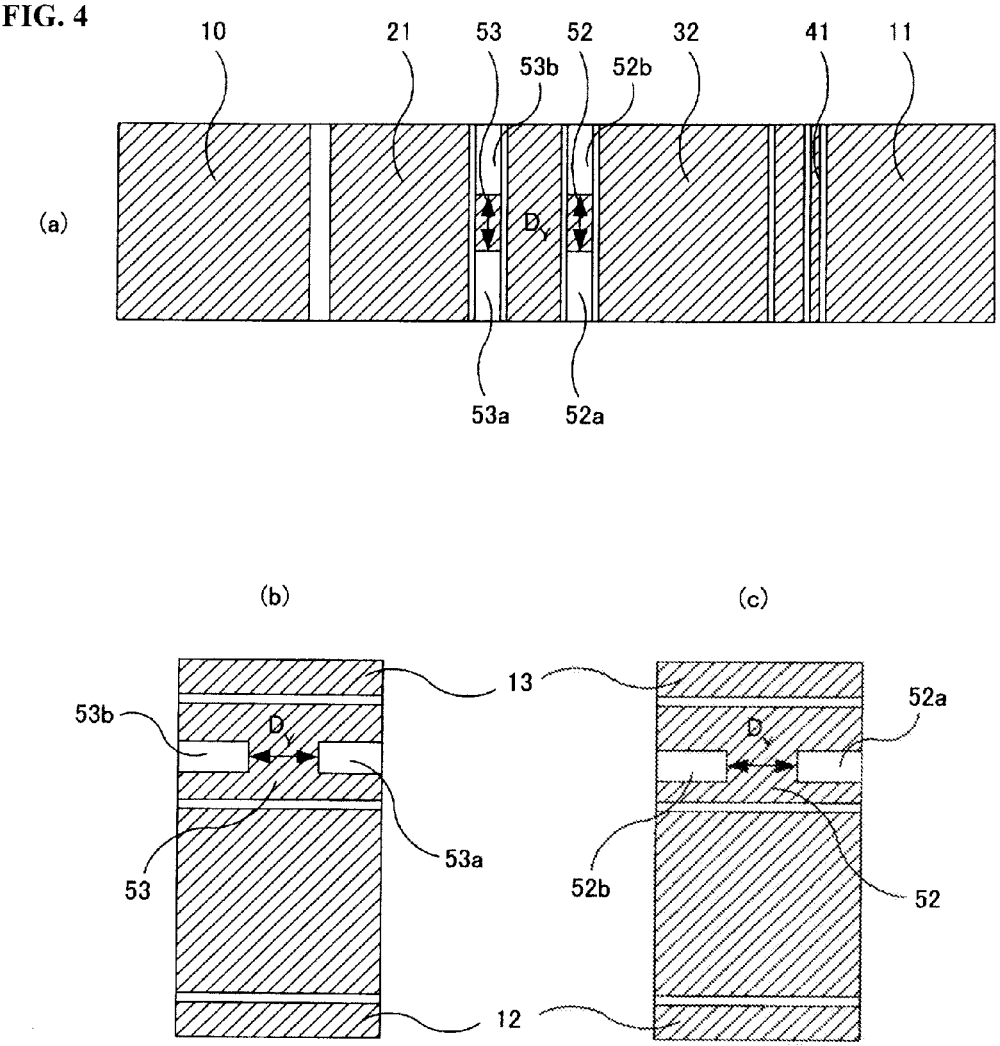
FIGS. 4(a) to 4(c) are cross sectional diagrams showing the sensor mechanism body in FIG. 3.

FIG. 3 is a side diagram showing an example of the single block type sensor mechanism body according to the second embodiment, FIG. 4(a) is a cross sectional diagram along line D-D in FIG. 3, FIG. 4(b) is a cross sectional diagram along line E-E in FIG. 3, and FIG. 4(c) is a cross sectional diagram along line F-F in FIG. 3. Here, the same symbols are attached to the same components as in the above described sensor mechanism body 101 and the descriptions thereof are not repeated.

The sensor mechanism body 51 is one rectangular parallelepiped block body made of an aluminum alloy and formed of a main Roberval mechanism R1, a sub-Roberval mechanism R2, a first lever 31, a second lever 32 and connection members 41, 52 and 53 for connecting the main Roberval mechanism Ra, the sub-Roberval mechanism R2, the first lever 31 and the second lever 32 to each other through holes and slits which penetrate in the direction Y (direction of the thickness).

Cut sections 52a, 52b, 53a and 53b having cuts in opposite ends in the direction Y (direction of the thickness) are created in the center sections of the connection members 52 and 53.

Here, the size of the cut sections 52a, 52b, 53a and 53b are determined by calculations, adjusting operations and the like so that the amount of twist of the path from the first lever 31 and the amount of twist of the path from the sub-Roberval mechanism R2 are the same along the second lever 32. At this time, the amount of twist of the path from the sub-Roberval mechanism R2 is considerably greater than the amount of twist of the path from the first lever 31, and therefore only the cut sections 53a and 53b may be created without cut sections 52a and 52b.

As a result, the common fixed column 10 in the sub-Roberval mechanism R2 is connected to the second lever 32 through the second beams 22, 23, the second movable column 21 and the connection member 52 having a thickness $D_y$ in the center section, and therefore the amount of twist of the path from the first lever 31 and the amount of twist of the path from the sub-Roberval mechanism R2 can be the same along the second lever 32 when the connection members flexibly change their forms, and thus the position of the second lever 32 in the case where a twisting torque works on the second lever 32 can be maintained the same as in the state in the case where the twisting torque is not working on the second lever 32. Accordingly, a shift error that could be caused by the twist from the sub-Roberval mechanism R2 can be cancelled out.

Third Embodiment

Figure 5:
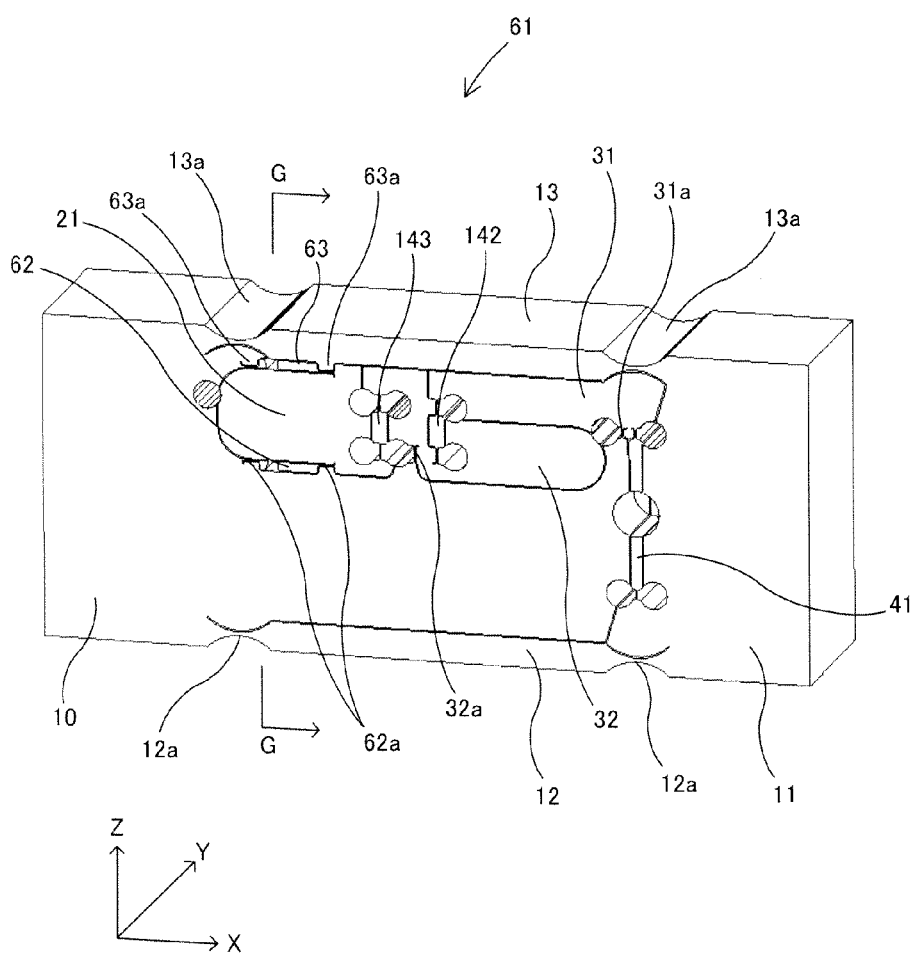
FIG. 5 is a side diagram showing an example of the single block type sensor mechanism body according to the third embodiment.
Figure 6:
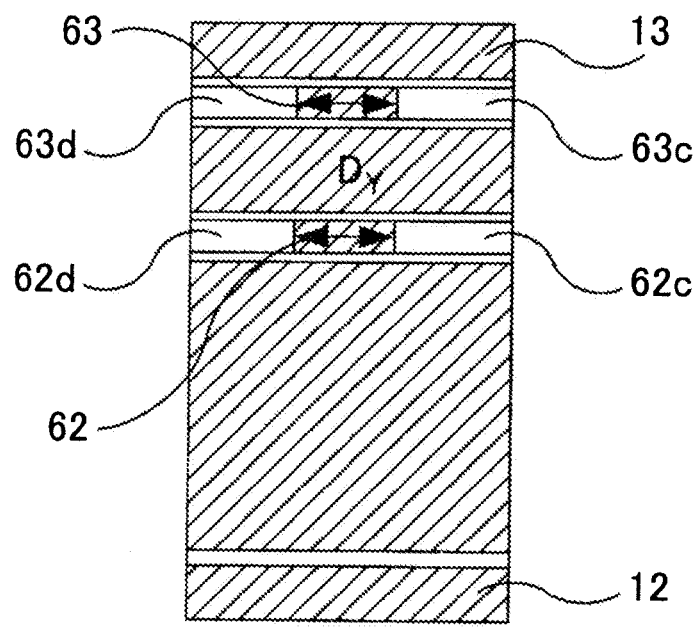
FIG. 6 is a cross sectional diagram showing the sensor mechanism body in FIG. 5.
Figure 8:
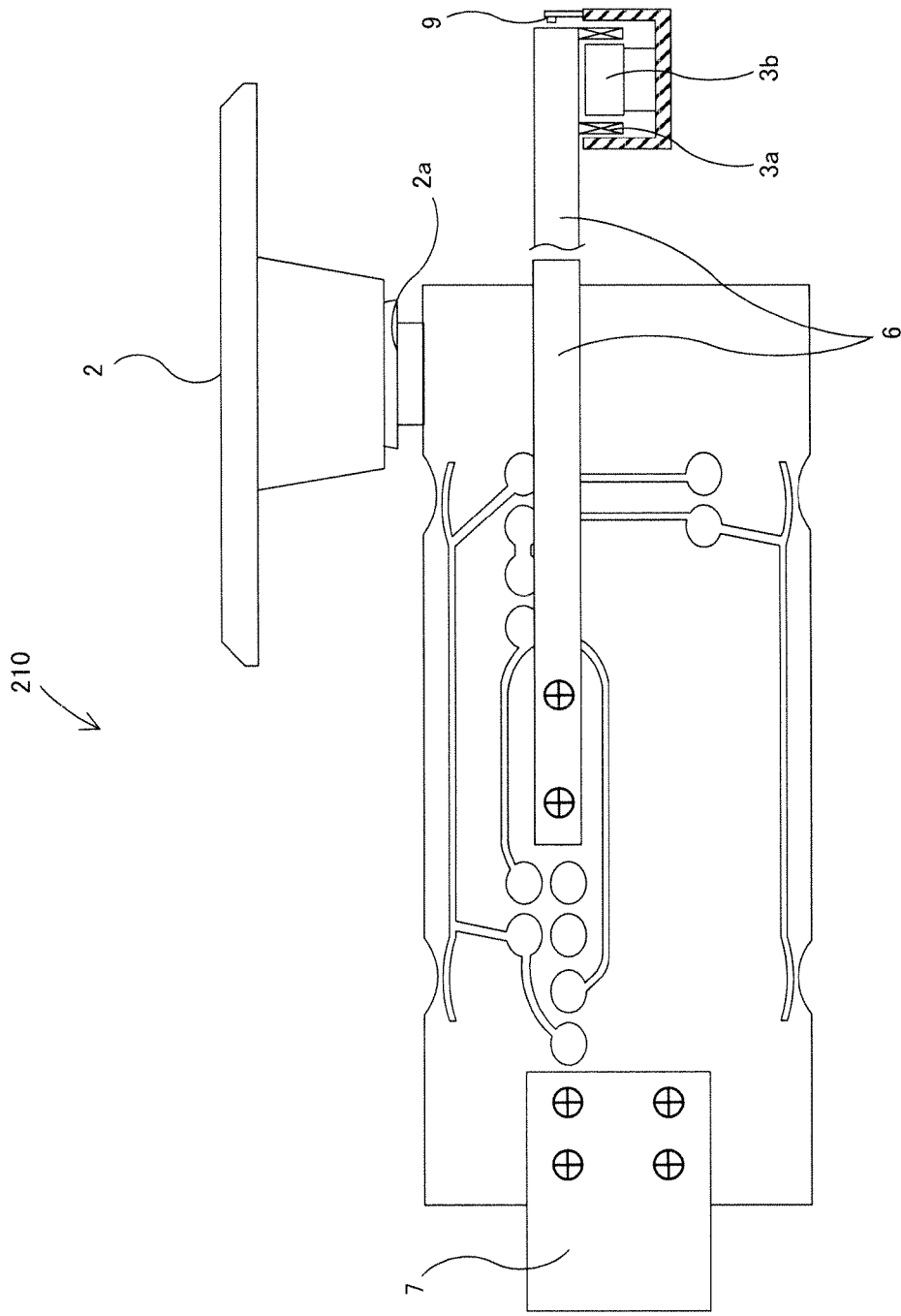
FIG. 8 is a side diagram showing an example of an electronic balance having the sensor mechanism body in FIG. 7.
Figure 9:
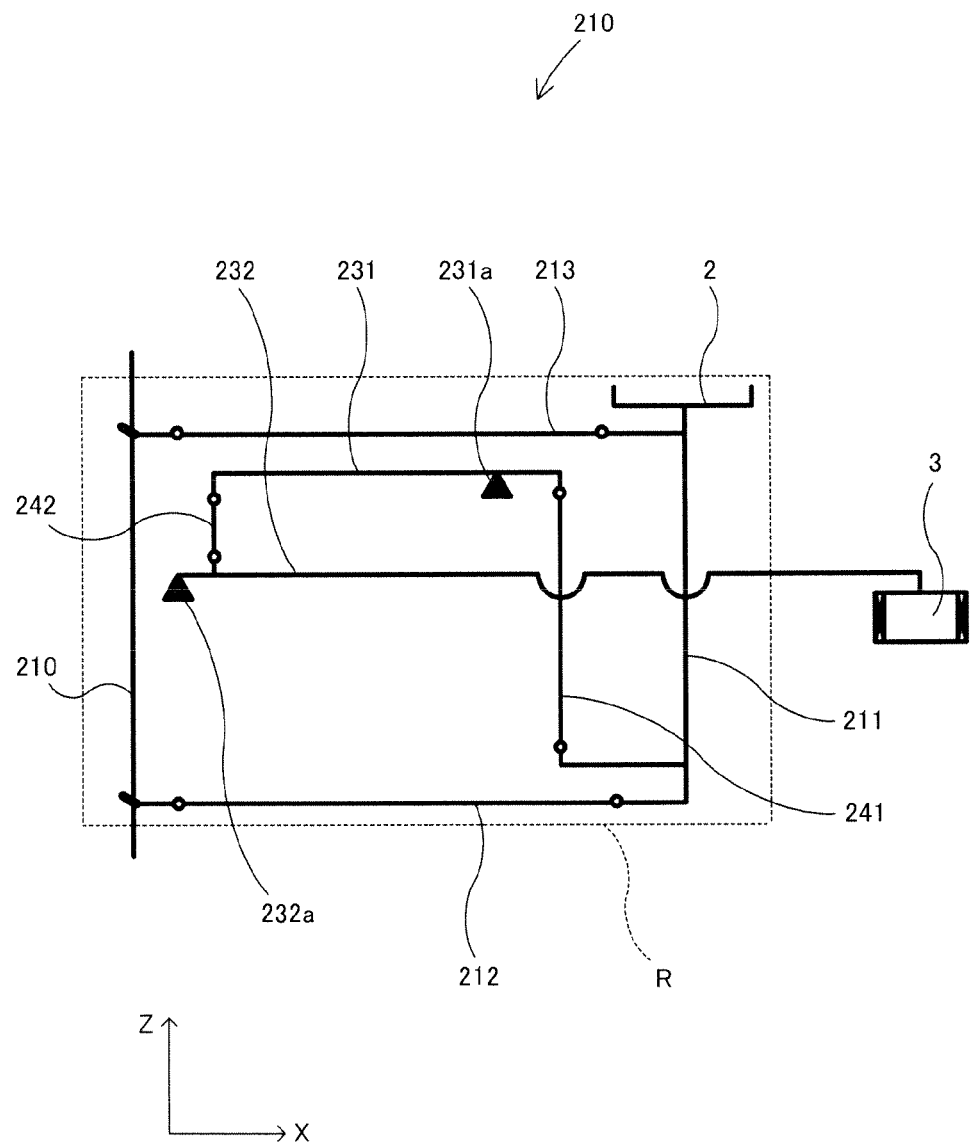
FIG. 9 is a diagram schematically showing the structure of the electronic balance in FIG. 7
Figure 10:
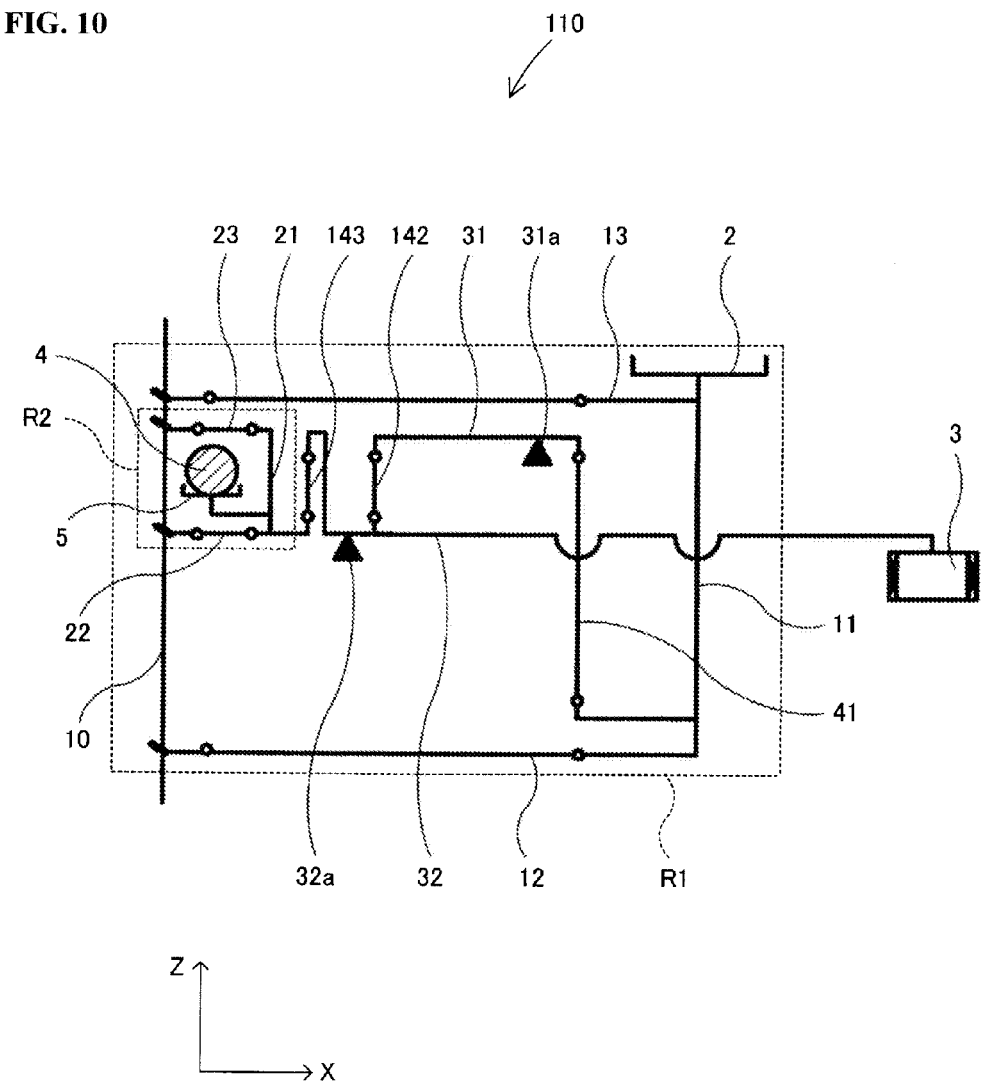
FIG. 10 is a diagram schematically showing the structure of an electronic balance where an internal weight is installed.
Figure 11:
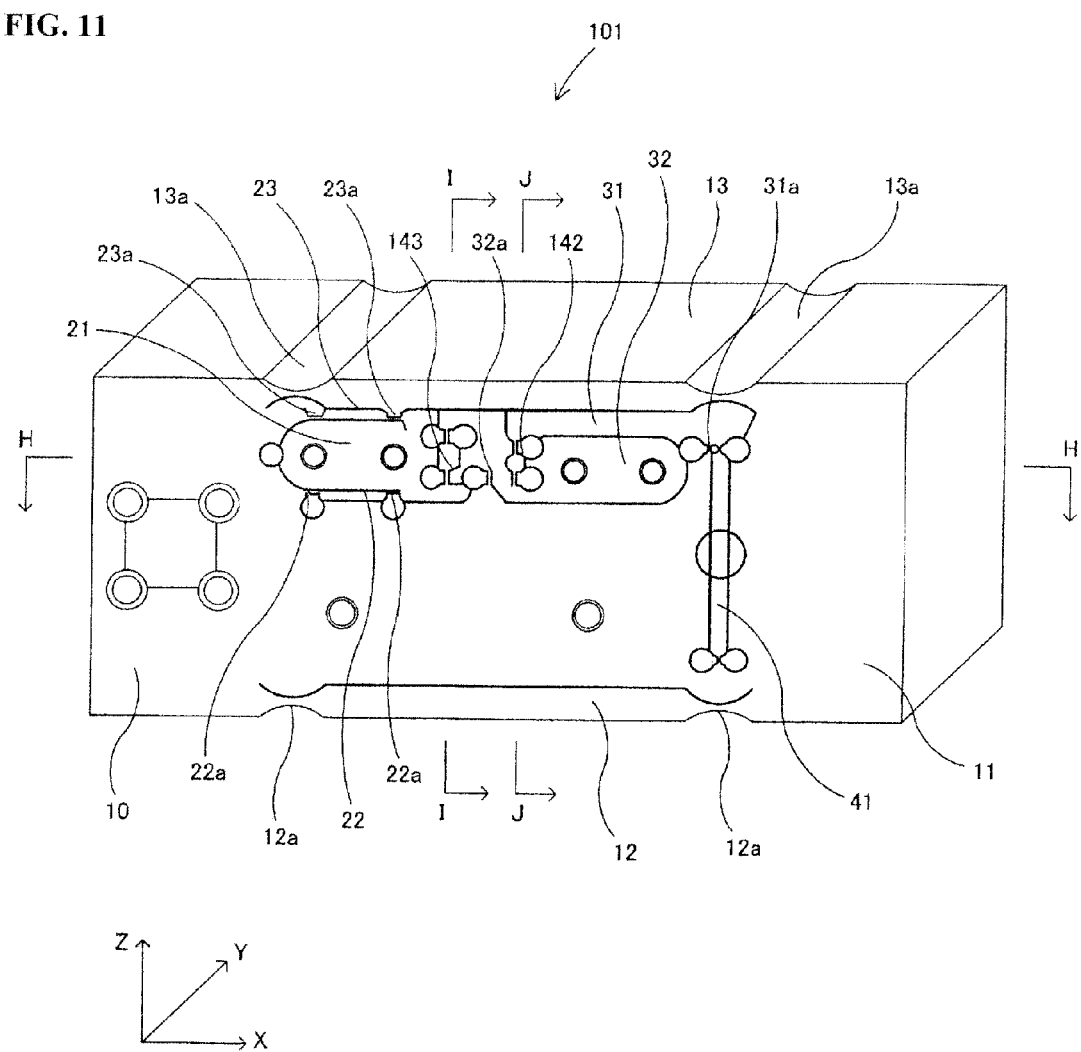
FIG. 11 is a side diagram showing an example of a single block type sensor mechanism body.
Figure 12:
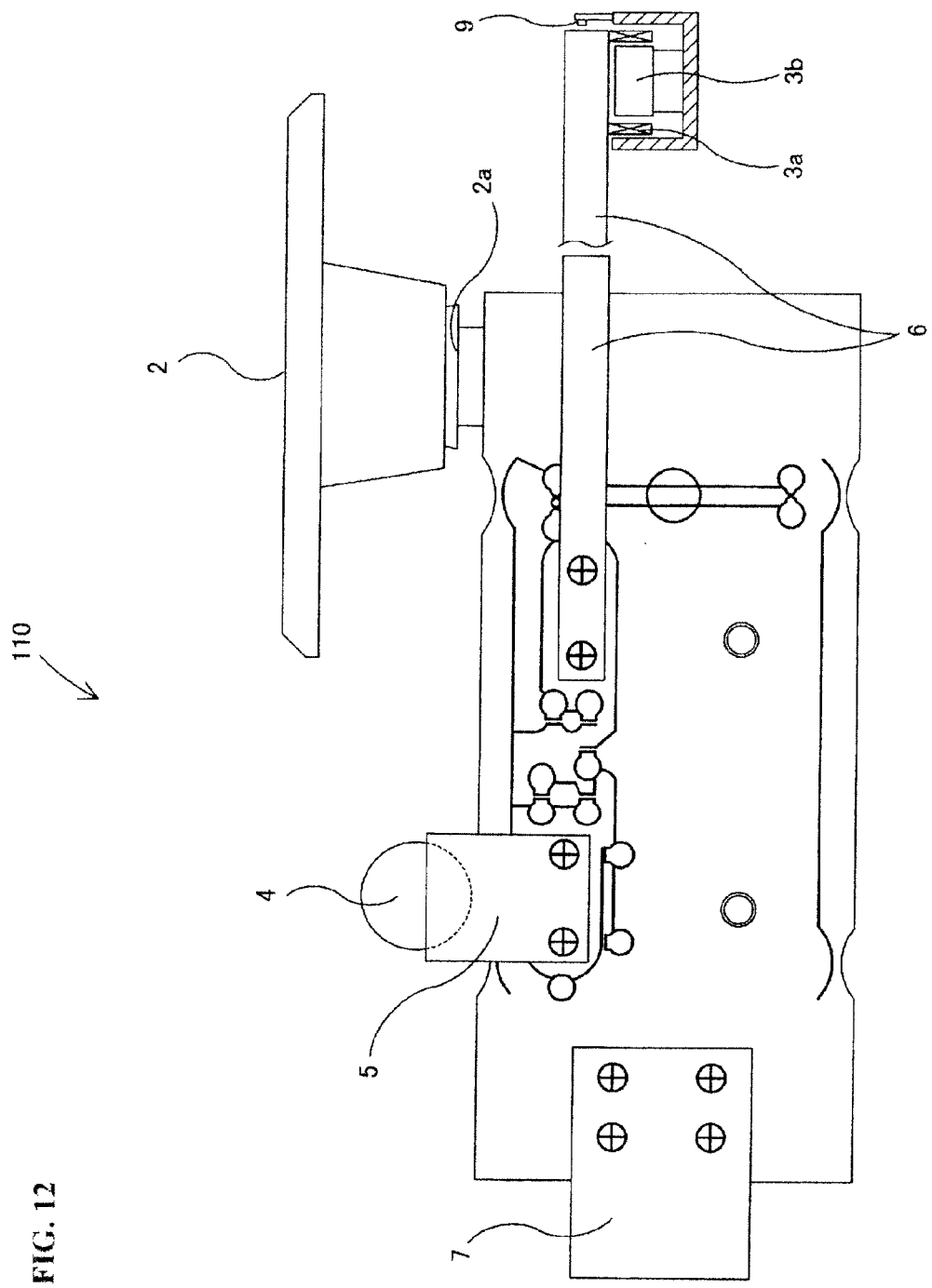
FIG. 12 is a side diagram showing an example of an electronic balance having the sensor mechanism body in FIG. 11.
Figure 13:
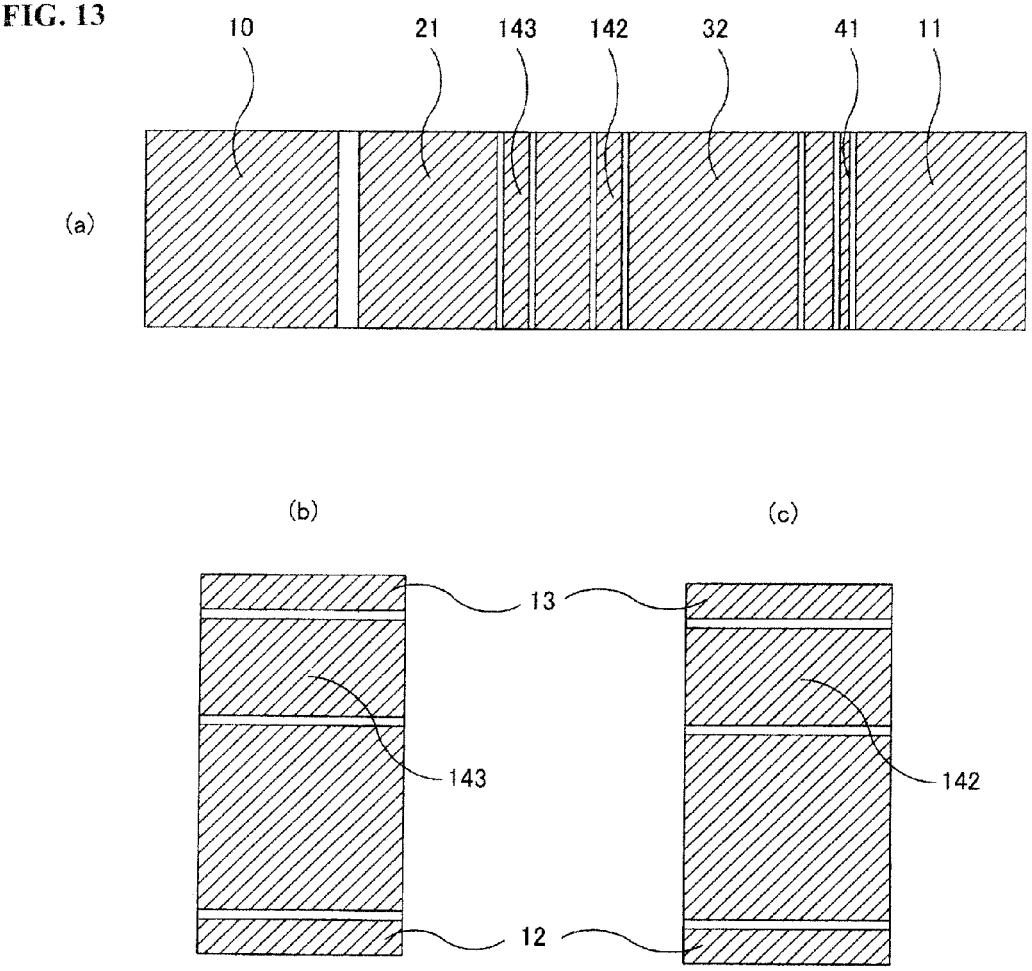
FIGS. 13(a) to 13(c) are cross sectional diagrams showing the sensor mechanism body in FIG. 11.

FIG. 5 is a side diagram showing an example of the single block type sensor mechanism body according to the third embodiment, and FIG. 6 is a cross sectional diagram along line G-G in FIG. 5. Here, the same symbols are attached to the same components as in the above described sensor mechanism body 101 and the descriptions thereof are not repeated.

The sensor mechanism body 61 is one rectangular parallelepiped block body made of an aluminum alloy and formed of a main Roberval mechanism R1, a sub-Roberval mechanism R2, a first lever 31, a second lever 32 and connection members 41, 142 and 143 for connecting the main Roberval mechanism Ra, the sub-Roberval mechanism R2, the first lever 31 and the second lever 32 to each other through holes and slits which penetrate in the direction Y (direction of the thickness).

The sub-Roberval mechanism R2 is formed of a common fixed column 10, a second movable column 21 to which an engaging section 5 is fixed by means of screws, and two second beams 62, 63 having flexible sections 62a, 63a at the two ends. In addition, the second movable column 21 and the common fixed column 10 are connect through the two second beams 62, 63 which are parallel to each other in the structure.

Cut sections 62c, 62d, 63c and 63d having cuts in opposite ends in the direction Y (direction of the thickness) are created in the vicinity of the center of the second beams 62, 63 between the flexible sections 62a and 63a.

Here, the size of the cut sections 62c, 62d, 63c and 63d is determined through calculations, adjusting operations and the like so that the amount of twist of the path from the first lever 31 and the amount of twist of the path from the sub-Roberval mechanism 112 are the same along the second lever 32.

As a result, the common fixed column 10 in the sub-Roberval mechanism 112 is connected to the second lever 32 through the second beam 62 having a thickness $D_Y$ in the center section, the second beam 63 having a thickness $D_Y$ in the center section the second movable column 21 and the connection member 143, and therefore the amount of twist of the path from the first lever 31 and the amount of twist of the path from the sub-Roberval mechanism R2 can be the same along the second lever 32 when the second beams 62, 63 in the sub-Roberval mechanism R2 flexibly change their forms, and thus the position of the second lever 32 in the case where a twisting torque works on the second lever 32 can be maintained the same as in the state in the case where the twisting torque is not working on the second lever 32. Accordingly, a shift error that could be caused by the twist from the sub-Roberval mechanism R2 can be cancelled out.

INDUSTRIAL APPLICABILITY

The sensor mechanism body and electronic balance according to the present invention provide such a structure that an internal weight is used for correction, and thus they are useful.

The invention claimed is:

1. A sensor mechanism body, comprising:
a main Roberval mechanism provided with a first fixed column fixed to or integrated with an electronic balance base, a first movable column for transmitting load of an object to be measured placed on a weighing plate, and two first beams parallel to each other for connecting the first movable column to the first fixed column so that the first movable column transmits the load of the object to be measured in a vertical direction;
a sub-Roberval mechanism provided with a second fixed column fixed to or integrated with the electronic balance base, a second movable column for transmitting load of an internal weight mounted on an engaging section, and two second beams parallel to each other for connecting the second movable column to the second fixed column so that the second movable column transmits the load of the internal weight in the vertical direction;
a first lever rockably supported by a first fulcrum; and
a second lever rockably supported by a second fulcrum, wherein:
the first movable column in the main Roberval mechanism is connected to a first end of the first lever and the second lever is connected to a second end of the first lever,
the second movable column in the sub-Roberval mechanism is connected to a first end of the second lever, and an electromagnetic force generating device and the second end of the first lever are connected to a second end of the second lever, and
the second fixed column in the sub-Roberval mechanism is connected to the second lever through a thin-walled connection section where cuts are created in opposite ends from both sides of the sensor mechanism body in a direction of a thickness, which is perpendicular to the vertical direction.

2. The sensor mechanism body according to claim 1, further comprising a connection member for connecting the second movable column to the second lever,
wherein the thin-walled connection section is formed in a first attachment section for attaching the connection member to the second movable column, a second attachment section for attaching the connection member to the second lever, or a connection member section between the first attachment section and the second attachment section.

3. The sensor mechanism body according to claim 1, wherein:
the second beams have flexible sections at the two ends, and
the thin-walled connection section is formed in a flexible section or in a portion of a second beam between the flexible sections.

4. The sensor mechanism body according to claim 1, wherein the first fixed column and the second fixed column shares a same portion of the sensor mechanism body.

5. The sensor mechanism body according claim 1, wherein the main Roberval mechanism, sub-Roberval mechanism, first lever and second lever are formed so as to be integrated into a rectangular parallelepiped block through a number of through holes and slits provided so as to penetrate in the direction of the thickness.

6. An electronic balance, comprising:
the sensor mechanism body according to claim 1;
the internal weight;
the electromagnetic force generating device; and
a switching mechanism that switches the state of the internal weight between a first state where the load of the internal weight is applied to the engaging section in the sub-Roberval mechanism and a second state where the load of the internal weight is not applied to the engaging section in the sub-Roberval mechanism.

* * * * *